(No Model.) 2 Sheets—Sheet 1.

J. N. MOEHN & J. GRAVES.
BICYCLE.

No. 514,198. Patented Feb. 6, 1894.

Witnesses. *Fig. 3.* Inventors.
C. H. Keeney, John N. Moehn and
Anna C. Faust. John Graves,
By Benedict & Morsell
Attorneys.

(No Model.) 2 Sheets—Sheet 2.
J. N. MOEHN & J. GRAVES.
BICYCLE.
No. 514,198. Patented Feb. 6, 1894.
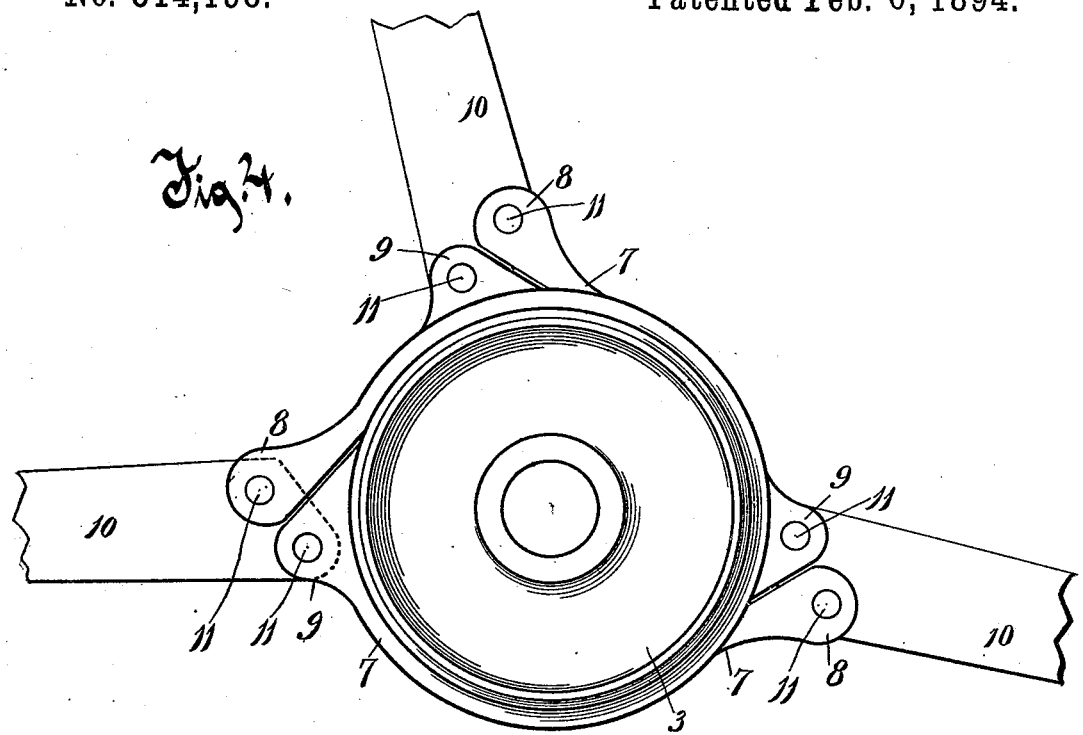
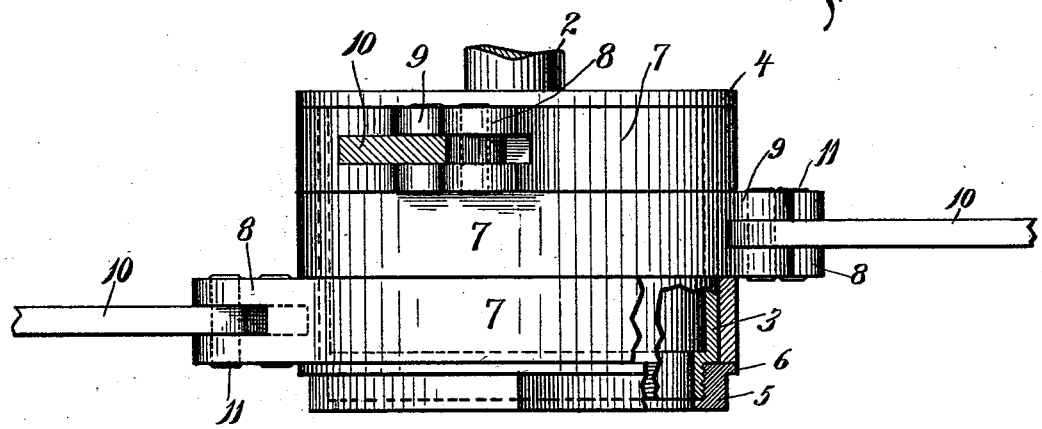

UNITED STATES PATENT OFFICE.

JOHN N. MOEHN, OF DRUECKER, AND JOHN GRAVES, OF MILWAUKEE, ASSIGNORS OF ONE-THIRD TO DENNIS J. HAYES, OF MILWAUKEE, WISCONSIN.

BICYCLE.

SPECIFICATION forming part of Letters Patent No. 514,198, dated February 6, 1894.

Application filed September 14, 1893. Serial No. 485,448. (No model.)

*To all whom it may concern:*

Be it known that we, JOHN N. MOEHN, of Druecker, in the county of Ozaukee, and JOHN GRAVES, of Milwaukee, in the county of Milwaukee, State of Wisconsin, have invented a new and useful Improvement in Bicycles, of which the following is a description, reference being had to the accompanying drawings, which are a part of this specification.

Our invention has relation to improvements in bicycles.

The object is to provide an improved propelling mechanism, adjustable to almost any form of bicycle frame, wherein the greatest possible leverage is attained and consequently an increase of speed, without in the least augmenting the labor necessary in operating the machine.

The invention consists of the devices and parts as hereinafter described and claimed, or their equivalents.

Figure 1:
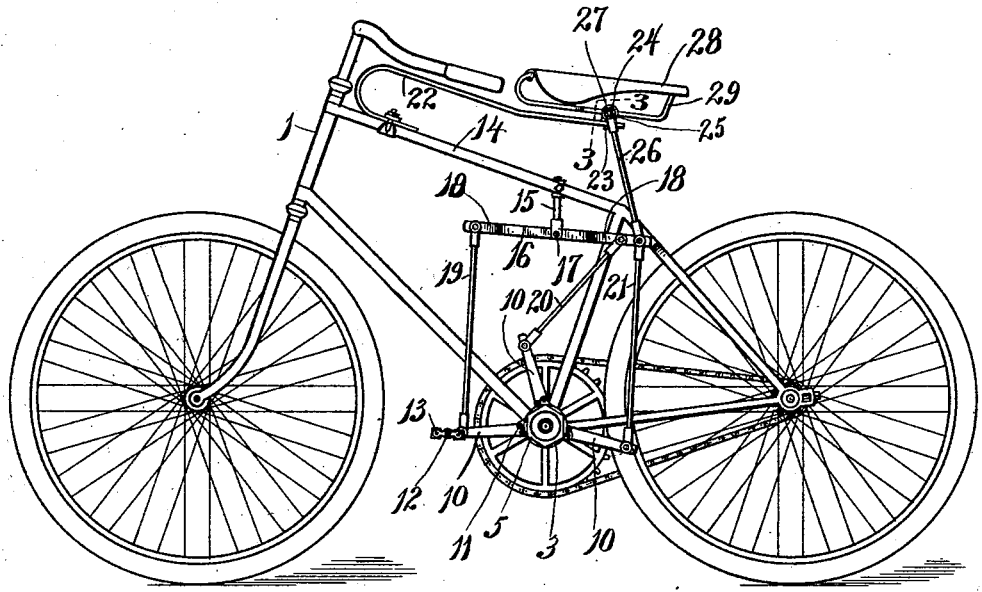
Figure 2:
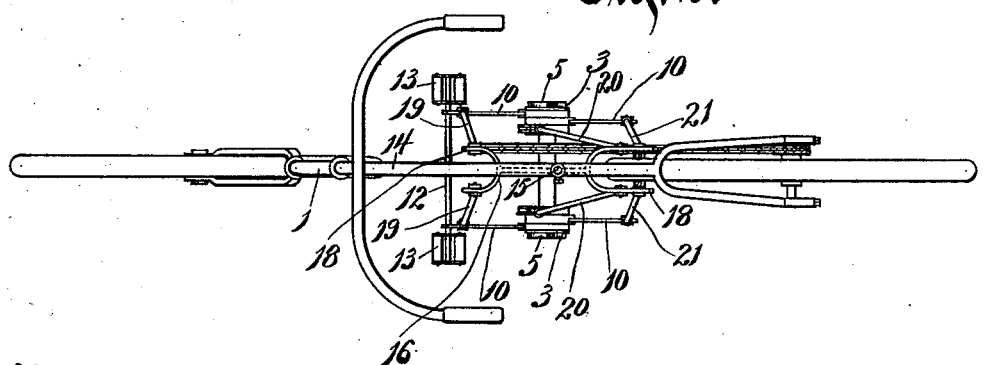
Figure 2:
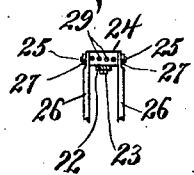

In the accompanying drawings, Figure 1, is a side elevation of a bicycle with our improvements applied thereto. Fig. 2, is a plan view with the saddle, the link connected to the saddle, and the saddle supporting spring removed. Fig. 3, is a transverse section on the line 3—3 of Fig. 1, looking toward the right. Fig. 4, is an enlarged side elevation of the cylinder or enlargement attached to the end of the driving axle, showing the clamping rings or straps applied thereto, and the levers connected to said straps, and Fig. 5, is a plan view of Fig. 4, with a portion broken away.

Like numerals of reference denote like parts throughout the several views.

Referring to the drawings, the numeral 1 indicates a bicycle frame, having the same general characteristics of an ordinary form of bicycle frame, excepting in the arrangement of the saddle, and in the omission of the cranks at the ends of the driving axle, and the treadles connected to said cranks. Instead of employing cranks and foot treadles, we form or provide the opposite ends of the driving axle 2, with enlargements 3, 3 preferably of hollow or tubular form, with open outer sides. The inner end of each enlargement is formed with an annular flange 4, while a similar flange is provided at the outer end by forming said outer end into a reduced threaded portion, and coupling to said reduced threaded end a ring or annulus 5, having an annular flange 6. Between the two flanges 4 and 6 of each enlargement an exterior annular recess is formed for the reception of a series of metallic spring clamping rings or straps 7, preferably three for each recess. The ends of these split rings or straps terminate in bifurcated ears 8 and 9, the former projecting out over and overlapping the latter. In the case of the outer rings, the overlapping ears 8 are uppermost, while in the case of the central rings, the overlapping ears are undermost.

The numeral 10 indicates short levers which pass into the bifurcated ears of each clamping ring, being pivoted in each ear by pivot pins 11, 11. The two forward levers are connected by means of a transverse rod 12, which is provided upon its ends with foot treadles 13, 13.

From the top bar 14 of the frame depends an arm 15, the lower bifurcated end thereof straddling medially a rocking lever 16, said rocking lever pivoted to the rod by means of a transverse pivot pin 17. The opposite ends of the rocking lever are formed into yokes 18, 18. Pivotally connected to the arms formed by the forward yoke are depending links 19, which connect pivotally at their lower ends to the levers 10 of the outer clamping rings or straps 7. Similar links 20 connect medially the arms formed by the rear yoke with the levers 10 of the inner rings or straps, and links 21 the extremities of said arms of the rear yoke with the levers of the central rings or straps.

The numeral 22 indicates a saddle supporting spring, which at its forward end is turned under and clipped to the top bar 14 of the machine. The rear end of the spring has secured thereto, by means of a bolt 23, a transverse rod 24, preferably of circular form, which is provided upon its ends with trunnions 25, 25, which receive the upper ends of links 26, 26, said links being held thereto by means of nuts 27, 27. The lower ends of the links 26 are secured to the extremities of the arms of the rear yoke 18 by means of the same bolts that connect the links 21.

The saddle is indicated by the numeral 28, and the saddle supporting rods by the numeral 29, the ends of these rods passing through, and secured in, the transverse circular rod 24.

The moment a rider mounts the machine, and as his weight is brought to bear upon the saddle, said saddle is at once depressed. This has the effect of pushing down upon the links 20 and 21, respectively, through the links 26 and lifting the links 19. This down movement of the links 20 will turn the levers 10 connected to the inner clamping rings in the direction of the line of movement of the machine, and cause the overlapping lugs 8 to bite the under lugs, the contacting edges of the lugs being beveled (which is also true in regard to all the several lugs) to allow for the contraction of the rings. As the rings are thus brought to embrace the cylinder firmly, they will cause said cylinder to rotate forward with the continued push on the lever 10. The down movement of the links 21, however, have an exactly opposite effect. These links operate upon the levers 10 connected to the central rings, and exert a rearward push on said levers, which, owing to the fact that the lugs 8 are undermost, will cause the central clamping rings to separate at their ends, and thus unclamp from the cylinder. The same result occurs from the uplifting of the links 19, as will be readily apparent from the drawings. The next action of the rider is to depress the foot treadles. This will cause the forward turning of the levers 10 connected to the outer rings, and through the links 19 the turning of the rocking lever 16 on its pivot, throwing up the rear end of said rocking lever, and elevating the links 20 and 21, respectively, which of course act upon levers 10 respectively connected to the central and inner rings, and cause a reverse action upon said rings than that described in reference to the action when the saddle is depressed.

It is apparent that with the continued alternate actions upon the treadles and saddle, the machine is forced forward with great impetus and rapidity with but a minimum of power being necessary.

An important feature of our invention is its adaptability to almost any form of bicycle frame, with but the necessity of removing the cranks and treadles from the driving axle.

From the fact that the enlargements 3, 3 are of tubular form, lightness is not only secured, but at the same time these cylinders form a convenient receptacle for the introduction of cyclometers.

While we have described more or less specific forms we do not intend to limit ourselves thereto, but contemplate the substitution of equivalents and changes in form and material whenever they may be necessary.

It is obvious that successful results may be obtained by omitting altogether the central clamping rings, and the levers and links operating the same inasmuch as when foot pressure is applied, the outer rings will operate to turn the axle, and the inner rings will be unclamped from the axle, and vice versa, when foot pressure is removed, the inner rings will clamp the axle, and turn the same and the outer rings will be disengaged from the axle.

Having thus described our invention, what we claim, and desire to secure by Letters Patent of the United States, is—

1. In a bicycle, the combination, of a driving axle, split rings embracing said axle, levers pivoted to the adjacent ends of the rings, the forward levers connected to move in unison by foot pressure, a medially pivoted rocking lever, links connecting the forward end of said rocking lever with the forward-extending foot-operated levers, and adapted to operate upon said levers to cause the rings to which they are connected to clamp the axle and rotate the same, when foot pressure is exerted, and to unclamp from the axle when foot pressure is removed, links connecting the rear end of the rocking lever with the rearward-extending levers of the rings, and adapted when foot pressure is removed to operate upon said levers to cause the rings to which they are connected to clamp the axle and rotate the same, and when foot pressure is exerted to unclamp from the axle, a vertically movable saddle, and links connecting said saddle with the rear end of the rocking lever, substantially as set forth.

2. In a bicycle, the combination, of a driving axle, split rings embracing said axle, levers pivoted to the adjacent ends of the rings, the forward levers connected to move in unison by foot pressure, said foot operated levers and the levers connected to the central rings constructed to clamp their respective rings to the axle as foot pressure is exerted, and to unclamp therefrom when foot pressure is removed, and the levers connected to the inner rings constructed, to unclamp from the axle when the foot pressure is exerted, and to clamp said axle when foot pressure is removed, and pressure is exerted on the saddle, a medially pivoted rocking lever, links connecting the forward end of said rocking lever with the levers of the outer rings, links connecting the rear end of the rocking lever with the respective levers of the inner and central rings, a vertically movable saddle, and a link connecting said saddle with the rear end of the rocking lever, substantially as set forth.

3. In a bicycle, the combination, of a driving axle, formed or provided with enlarged cylindrical ends recessed peripherally, clamping rings disposed in the recesses, the ends of said rings terminating in ears or lugs, the upper lugs of the outer and inner rings overlapping, respectively, the lower lugs, and the lower lugs of the central rings overlapping the upper lugs thereof, levers pivoted to the adjacent ends of the rings, the forward levers connected to move in unison by foot pressure, a medially pivoted rocking lever, links connecting the forward end of said rocking lever with the levers of the outer rings, links connecting the rear end of the rocking lever with the respective levers of the inner and central rings, a vertically movable saddle, and a link connecting said saddle with the rear end of the rocking lever, substantially as set forth.

In testimony whereof we affix our signatures in presence of two witnesses.

JOHN N. MOEHN.
JOHN GRAVES.

Witnesses:
ARTHUR L. MORSELL,
C. T. BENEDICT.